United States Patent
Bevan et al.

(10) Patent No.: US 6,778,130 B1
(45) Date of Patent: Aug. 17, 2004

(54) POSITION LOCATION METHOD AND APPARATUS FOR A MOBILE TELECOMMUNICATIONS SYSTEM

(75) Inventors: David Damian Nicholas Bevan, Bishop's Stortford (GB); John Edward Hudson, Stansted (GB); Francis Giles Overbury, Great Dunmow (GB); Christopher John Reed, Potters Bar (GB); Simon John Gale, Bishop's Stortford (GB)

(73) Assignee: Nortel Networks Limited, St. Laurent (CA)

( * ) Notice: Subject to any disclaimer, the term of this patent is extended or adjusted under 35 U.S.C. 154(b) by 18 days.

(21) Appl. No.: 10/005,297

(22) Filed: Dec. 5, 2001

Related U.S. Application Data

(62) Division of application No. 09/397,760, filed on Sep. 16, 1999.

(51) Int. Cl.[7] ............................................. G01S 7/40
(52) U.S. Cl. ..................... 342/174; 342/442; 342/360; 342/369
(58) Field of Search ............................. 342/174, 442, 342/360, 369

(56) References Cited

U.S. PATENT DOCUMENTS

| 4,494,118 A | * | 1/1985 | Graves ........................ 342/442 |
| 5,977,913 A | * | 11/1999 | Christ ......................... 342/465 |
| 6,232,918 B1 | * | 5/2001 | Wax et al. ................... 342/360 |

* cited by examiner

Primary Examiner—Theodore M. Blum
(74) Attorney, Agent, or Firm—Barnes & Thornburg LLP

(57) ABSTRACT

In a cellular mobile telecommunications system the position of a mobile station can be estimated in terms of its bearing and range from a cell site. A multi-element direction finding antenna at the cell site receives signals from the mobile station and a receiver circuit estimates the bearing using the relative phase of signals received at different antenna elements and estimates the range by measuring round trip delay of signals to and from the mobile station. Motion of the mobile station can introduce errors into the bearing estimate due to frequency offset and frequency spread when element sampling is non-simultaneous. Compensation for these errors is introduced by using signal samples successively received at the same antenna element to estimate Doppler frequency offset and spread. It is necessary to ensure accurate calibration of the direction finding antenna and the receiver circuit. This is done by injecting calibration signals into the circuit near the antenna or into the antenna itself from a near field probe. Other aspects of calibration, such as antenna position, are calibrated using a remote beacon. A beacon emulating a mobile station but at a fixed, known location, or a beacon at an adjacent cell site may be used.

15 Claims, 11 Drawing Sheets

POSITION LOCATION METHOD AND APPARATUS FOR A MOBILE TELECOMMUNICATIONS SYSTEM

This application is a division of copending U.S. patent application Ser. No. 09/397,760, filed Sep. 16, 1999.

FIELD OF THE INVENTION

This invention relates to a method and apparatus for locating the position of a mobile station (MS) in a mobile telecommunications system.

DESCRIPTION OF THE PRIOR ART

It is desirable in certain applications for an operator of a mobile telecommunications system such as a cellular telecommunications system to be able to identify the geographical position of an MS during communication with a base transceiver station (BTS) of the system. For example, the US Federal Communications Commission (FCC) has implemented a position location mandate requiring system operators to be able to locate MS position with less than 125 m error in 67% of cases in order to provide an E911 (emergency) position location service in IS-95 based systems in the North American cellular and PCS bands.

A BTS may in principle locate the position of a MS by measuring the round-trip delay of a signal sent from the BTS to the MS and back (i.e. the elapsed time between transmission of a signal from the BTS and reception of the MS's response) to evaluate the distance from the BTS to the MS, and by estimating the angular bearing from the BTS to the MS. To implement the FCC mandate, we can determine that we are required to measure signal RTD to an accuracy of approximately 560 ns, corresponding to a longitudinal (radial) position error of 84 m rms (root mean square). Similarly, we can tolerate a lateral (circumferential) position error, due to errors in the bearing estimate, of 84 m rms. So in an urban (up to about 1 km cell radius) scenario we require less than 4.8° rms bearing error and in a rural environment (up to about 10 kM cell radius) less than 0.48° rms bearing error.

With any radio-based direction-finding system there are several mechanisms by which we can potentially obtain errors in attempting to estimate the angle of arrival and range of received signal sources, namely:

Error mechanisms in measuring signal round-trip delay (RTD)
Noise/Interference
Multipath (angle and delay spread)
Doppler
Calibration Errors

SUMMARY OF THE INVENTION

An object of the invention is to enable a radio-based direction finding system to reduce errors due to Doppler frequency shift and spread, and carrier frequency offset, in particular relating to potential errors due to MS motion in a cellular telecommunications system.

A further object of the invention is to enable calibration of a radio-based direction finding system in a radio telecommunications system such as a cellular telecommunications system, for example in order to overcome errors due to imperfections in the reception equipment (antennas, cables, filters, radio chains, etc).

The invention provides in its various aspects a method and apparatus for estimating a bearing from a base station or cellsite to a mobile station using a direction finding antenna coupled to a receiver circuit located at the base station or cell site, and to the calibration of the direction finding antenna and the receiver circuit, as defined in the appended independent claims. Preferred or advantageous features of the invention are set out in dependent subclaims.

The invention in a first aspect may thus advantageously provide a method and apparatus for compensating for errors in an estimated bearing between a multi-element direction finding antenna and a mobile station due to motion of the mobile station or due to carrier frequency offset. These errors may arise as a bearing bias due to frequency shift, or offset, or due to Doppler frequency spread caused by the combination of mobile station motion and multipath, if signals received at the antenna elements are not sampled simultaneously. This aspect of the invention may advantageously permit compensation for these sources of error by estimating the Doppler frequency offset and/or spread and applying compensation to the phases of signals sampled from each antenna element before the signal complex phasors are used to estimate the bearing of the mobile station. In preferred embodiments, the Doppler frequency offset and/or spread are estimated by applying a time-domain Fourier Transform to signal samples successively received at the same antenna element.

The invention in a second aspect may thus advantageously provide a method and apparatus for calibrating the direction finding antenna and/or the receiver circuit. Several techniques for achieving this are proposed, each having different advantages, and it is further proposed to employ a method of selecting appropriate techniques in different situations or applications. All of these techniques find particular application to direction and/or range finding in cellular radio telecommunications systems.

In its second aspect, the invention may thus provide a technique for injecting calibration signals into the receiver circuit near the antenna (preferably as near to the antenna as possible), to calibrate the phase-sensitive direction-finding circuitry. It may also provide a technique for transmitting calibration signals from a near-field probe for reception by the direction finding antenna and processing by the receiver circuitry. This advantageously permits calibration of aspects of the antenna as well as the receiver circuit. The second aspect of the invention may further provide two types of beacon. A first type preferably emulates a mobile station but is fixed in position at a known location. A base station can therefore set up a call to the beacon, termed an autonomous beacon mobile, and allow the direction finding antenna and receiver circuitry at the base station to estimate the location of the beacon during the call. Comparison of the estimated and known locations, in terms of bearing and/or range, may then advantageously allow calibration of substantially all aspects of the performance of the antenna and the receiver circuitry. The second type of beacon is mounted at a cell site of a cellular telecommunications system and advantageously transmits a calibration signal for reception by any direction finding antenna situated at a neighbouring cellsite which has a footprint covering the beacon. The beacon may advantageously transmit a signal allowing calibration of bearing estimation functions of the direction finding antennas at neighbouring cell sites. In a CDMA system, for example, such a signal may be transmitted in a guard band of the transmission bandwidth. If the beacon signal is of narrow bandwidth, it may only be effective for bearing estimation. However, if a beacon signal of sufficient bandwidth can be transmitted in an available guard band, it may be used for range calibration and/or to calibrate receiver functions such as receiver filters. Calibration resolution based on a beacon signal of limited bandwidth may advantageously be improved by averaging over time.

Further advantageously, preferred embodiments of the invention may enable a direction and range estimation system which meets the FCC E911 mandate in as many environments as possible. To achieve the necessary bearing accuracy in rural cells, which may be of large radius, the invention advantageously provides in a further aspect a direction finding antenna comprising two widely-spaced, multi-element subantennas. The resolution of the individual subantennas is advantageously sufficient to remove bearing ambiguities arising from the wide spacing of the subantennas.

DETAILED DESCRIPTION OF THE BEST MODE AND SPECIFIC EMBODIMENTS

Specific embodiments of the invention will now be described by way of example with reference to the drawings, in which.

In the embodiment, we combine direction finding (DF) and round trip delay (RTD) techniques to evaluate the direction or bearing from a BTS to a MS and the distance from the BTS to the MS. Given that the position of the BTS is known, the telecommunications system operator can then estimate the position of the MS.

The embodiments described below relate to a code division multiple access (CDMA) system but can be more widely applied to other types of system as would be appreciated by the skilled person.

Figure 1:
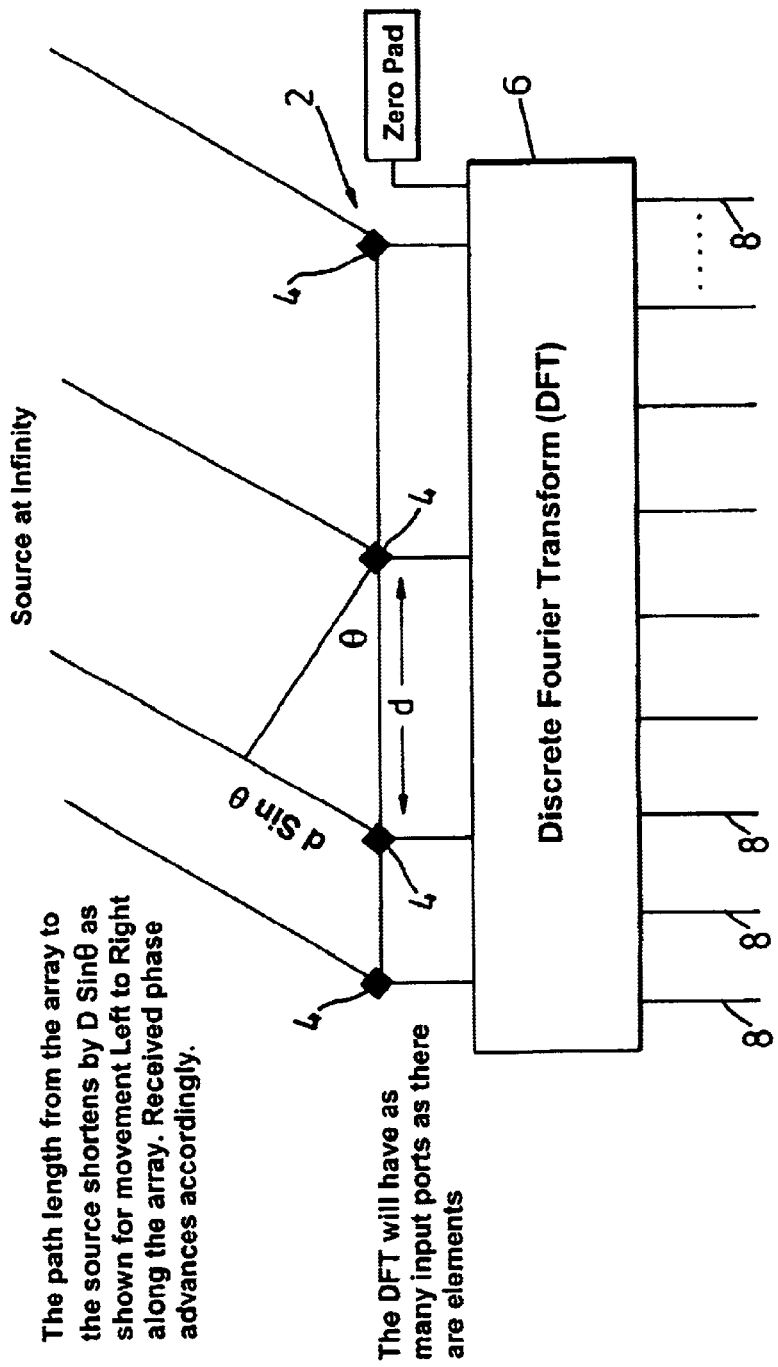
FIG. 1 illustrates the basic geometry of bearing estimation using a multi-element antenna array.

As illustrated in FIG. 1, angle of arrival (AOA) measurement assumes plane wave fronts, originating from the direct source (the MS) and from any reflectors, to be incident on an antenna array 2 comprising a plurality of array elements 4. Each element samples the arrival phase and amplitude of these waves. A processor then compares the phase at each element with all other elements in the array. If a single source subtends an angle θ with respect to array broadside the phase difference of the received signal at any element with respect to any other element is proportional to d sin θ where d is the spacing between the elements. The phase gradient along the array as position changes is therefore indicative of angle of arrival.

In principle, in the embodiment, bearing determination is achieved by correlating in time each input signal waveform received at each antenna element with a reference signal to generate a corresponding complex phasor, and then successively correlating in space the complex phase components seen at the array elements with a series of perfect sample sets representing given phase gradients or angles of arrival. The correlation in space is performed in a preferred embodiment by applying a discrete Fourier transform (DFT) 6 to the complex phase components seen at each element. That sample setmost closely representing the angle from which a particular wave front arrived will give maximum correlation hence the maximum amplitude component in the appropriate direction bin (Fourier transform output bin) 8.

Where more than one significant source, due to multipath for example, is incident on the array there will be correlation with each source and assuming that the sources can be fully resolved, a complex phasor having an amplitude proportional to the amplitude of each source will appear in the bin or bins associated to the angle of arrival of that component.

It should be noted that the above mentioned complex phase values used for testing correlation at each angle of arrival are identical with the values which, in reverse, would be used as element weighting to direct a beam in the desired direction. The DF (direction finding) process essentially forms receive beams in a number of directions then tests the signal which would be received in that direction. The beam producing maximum output is considered as marking the angle of arrival of the dominant component. Local maxima can also correspond to other incoming rays.

In practice, to average out noise it is advantageous to form a spatial correlation matrix of complex phasor samples derived from the antenna elements in successive sampling times, and then either to use beamforming or superresolution techniques to pick out signal bearings.

Figure 2:
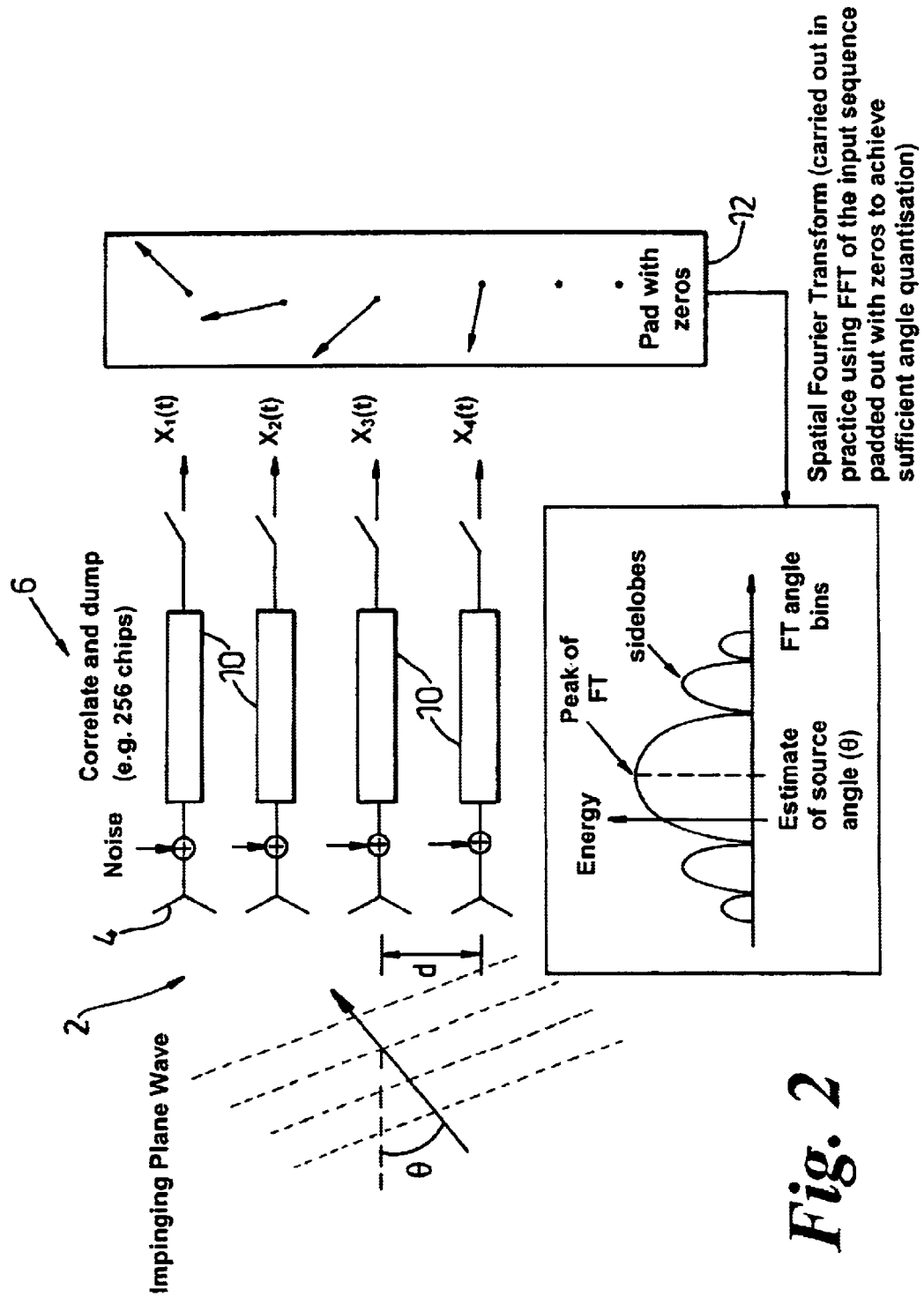
FIG. 2 illustrates the principles of the direction-finding method of a first embodiment of the invention.

This method of direction finding (DF) is illustrated in more detail in FIG. 2. We assume we have at our disposal at a base transceiver station (BTS) a linear antenna array with an equal inter-element spacing of d. We wish to estimate the azimuthal arrival angle of an impinging wavefront from an MS, which for simplicity at this stage we will assume is planar with a wavelength of λ (which for a carrier frequency in the 1900 MHz band will be of the order of 16 cm). The true angle of incidence of said wavefront with respect to the boresight angle is denoted θ. By simple geometrical arguments, the relative phase shift from element-to-element, φ, is constant, and given by:

$$\phi = (2\Pi d/\lambda)\sin\theta \tag{1}$$

In practice, the array may not be linear (it may be circular), and the elements may not have equal spacing. However, the same basic principles hold. In principle, the more elements we have, the better we can estimate angle of arrival (AOA) of the incoming signal from the MS. However, there are obvious real-world constraints here due to cost, aesthetics, etc. To enhance our angular resolution (to discriminate between multiple impinging wavefronts in a multipath environment) and improve our performance in noise, we would also like to maximise the inter-element spacing, in order to maximise relative phase-shift per element. However, we have to avoid ambiguities at larger inter-element spacings whereby different wavefront directions can cause the same phase shift due to 'spatial aliasing' (which prevents us relying on an AOA estimate purely using the widely-spaced main and diversity antenna elements at a conventional macrocellular cellsite).

In the case of an ideal benign channel, with no fading or angle spread, there would be no difficulty in selecting the best DF approach. This is because the problem is analogous to the selection of the parameters of a single-frequency complex tone from a finite number of discrete-time observations. In our case we wish to estimate the signal's spatial frequency (and hence in turn AOA) from a finite number of discrete observations across an antenna aperture. It is shown in Rife C. C. and Boorstyn R. R.: 'Single-Tone Parameter Estimation from Discrete-Time Observations' IEEE Trans. Inf. Theory, Vol. IT-20, No. 5, September 1974 and Brennan L. E.: 'Angular Accuracy of a Phased Array Radar' IRE Trans. on Radar and Propagation. May 1961, that the optimum estimator consists of a simple spatial Fourier Transform (combined with interpolation to effectively achieve infinite angle discretisation). In this benign case we would individually 'correlate-and-dump' (10 in FIG. 2) received signal samples on each antenna element 4 against a known reference (in the time domain) during a correlation period. At the end of this correlation period (a matched filtering operation) we obtain for each element a phasor value in terms of a complex number which is the sum of the complex baseband signal plus noise. Given a high enough carrier-to-noise-ratio (CNR), or signal to noise ratio (SNR), on each of these element samples we can then apply the spatial Fourier transform to the phase values, and the Fourier transform output angle bin containing the maximum energy (complex phasor magnitude squared) is our (unbiased) estimate of the signal bearing. Using this estimate, for a 4-element antenna array with $\lambda$ element-element spacing and a CNR of 9.2 dB on each element, we obtain a 1° rms bearing inaccuracy. Every doubling of the element spacing halves the rms bearing error, whilst every halving of the CNR leads to a factor of $\sqrt{2}$ increase in rms bearing error. As shown in FIG. 2, instead of applying interpolation to improve the angle bin quantisation we can alternatively pad out the phase values of the received samples with zeros 12. For example, to pad out the vector $[1\ 2\ 3\ 4]^T$ to eight elements we add zeros to give $[1\ 2\ 3\ 4\ 0\ 0\ 0\ 0]^T$, and apply a larger transform (e.g. a 128 or 256 point fast Fourier Transform (FFT)). The AOA estimate is achieved by selecting the FFT output bin with the largest energy (squared magnitude).

In the above process, we have correlated the signal on each element during a correlation period (dwell time) long enough to give us an element CNR sufficient to obtain minimal bearing estimate inaccuracy. In practice we may be constrained as to the length of this coherent integration period which we can exploit due to such effects as Doppler-spread induced signal fading, carrier offset, phase noise etc., and so the post-correlation CNR (and hence estimation accuracy) may be lower than we would really desire. The solution to this problem is to combine multiple individual bearing estimates each obtained as shown in FIG. 1 in order to obtain a single higher-quality estimate. If we have no knowledge of the change in absolute phase between different correlate-and-dump (time-domain correlation) periods, we have to combine these multiple bearing estimate 'snapshots' in an incoherent fashion (incoherent averaging). The way we do this is to add the individual spatial power spectra (in the power domain, so that we lose absolute phase information) before making a new selection of bearing estimate. For convenience we will henceforth refer to this technique as the Average Fourier-transform Direction Finding (AFDF) process. One key advantage of this AFDF technique, if the signal is fading, is that it weights the importance of each individual 'snapshot' by its individual CNR (if the noise power is kept constant). It is found that using no averaging with CNR=9 dB gives close to 1° rms bearing error as mentioned earlier. Allowing ourselves to exploit incoherent averaging in this way we can obtain good bearing estimates (better than 1° rms) even with poor CNRs 'per segment' around 0 dB (which could be the case if we have limited coherent averaging).

Advantageously, however, it may also be possible to combine information from successive time-domain correlation times coherently, as described later.

There are four basic phenomena which limit the performance of our DF system, and which thus determine the design parameters we should adopt, namely:

i) Noise/interference ii) Multipath iii) Mobile Doppler iv) Calibration errors (e.g. array pointing angle, filter phase errors etc.)

The present invention in its various aspects is concerned with Doppler errors and calibration errors. Doppler errors will be considered first.

Doppler errors can arise as follows. In a benign environment, free of multipath, the Doppler frequency offset in a signal received at the DF antenna due to motion of a MS is not a problem as long as the signals received on all the elements of the DF antenna are sampled simultaneously. In a preferred embodiment, however, the received signals are sampled sequentially by a commutating processor architecture. As described below, Doppler shift due to MS motion or carrier offset, can then lead to bearing bias. Doppler spreading in multipath environments can complicate these errors.

In practice, it should also be noted that a high level of Doppler spread is in some ways desirable for a direction finding system, as it ensures a good deal of averaging of the array response over different multipath relative phases, and hence can reduce the multipath error.

Commutating DF Processor Architecture

Most of the above discussion has implicitly assumed a DF system where we have a number of antenna elements spaced over some sufficiently wide aperture, and we carry out full signal processing on each element simultaneously, as implied in FIG. 2. However, in practice this is not a very cost effective architecture for the DF processing, and considerable -cost savings can be made if, according to an embodiment of the invention, we use a single receiver and commutate it across the antenna elements. An important issue with this commutated architecture is that it is susceptible to giving biased bearing estimates due to the effect of any Doppler shift or carrier frequency offset in the received signal.

Figure 3:
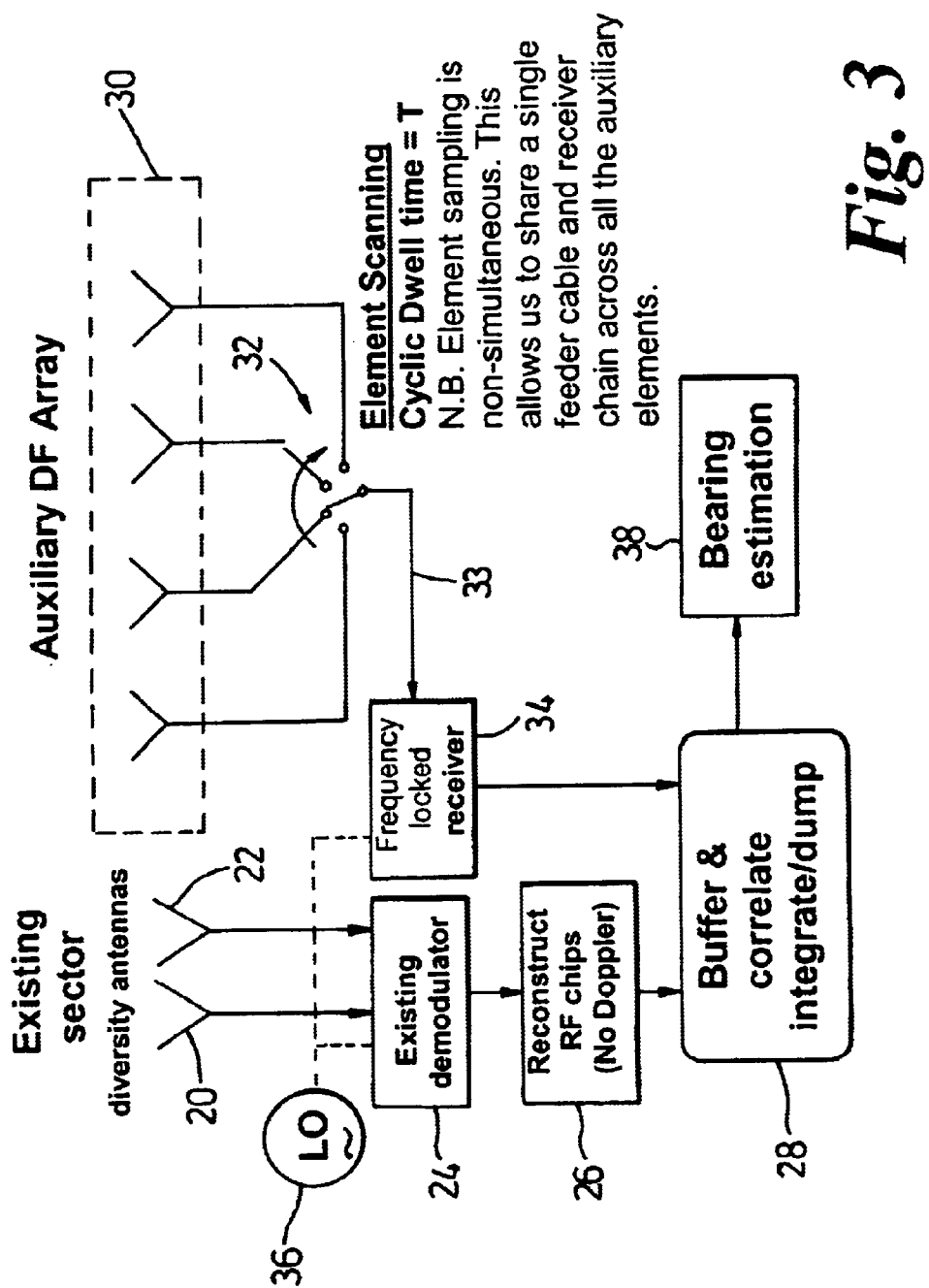
FIG. 3 is a block diagram of a cell site according to the embodiment of FIG. 2.

FIG. 3 illustrates the DF processor architecture of this embodiment. An existing BTS of a sector of a sectored cell in a cellular telecommunications system comprises main and diversity communications antennas 20, 22 coupled to a demodulator 24 for demodulating transmissions from MSs. The demodulator output is coupled to a circuit 26 for reconstructing the chips of each MS transmission in order to provide a reference timing and phase signal for the DF function. It should be noted that the generation of a reference signal may differ in different transmission systems. For example, a reconstruction process may be needed in systems with no pilot signal and non-linear modulation (e.g. IS-95). In other systems, for example pilot-aided systems, such a reconstruction process may not be needed, although it may be advantageous.

The reference signal is input to a correlate, integrate and dump processor 28 to provide the reference signal for time-domain correlation.

The conventional antennas of the BTS are supplemented by an auxiliary DF antenna 30 comprising four array elements. A cyclic switch 32 couples each array element in turn, for a dwell time T, via a feeder cable 33 to a frequency locked receiver 34. The communications demodulator 24 and the phase coherent receiver are both provided with a high frequency reference timing signal from a local oscillator 36, and the phase coherent receiver output is fed to the correlate, integrate and dump processor 28. This correlation processor 28 carries out the steps of correlating the signal from the receiver output with the reference signal by multiplying the received signal by the complex conjugate of the reference signal. The multiplied output is integrated over a predetermined time (e.g. 256 chips) by an integrator and the integrated output is dumped, or read, into a store. The integrator is then reset to zero and the procedure repeated. The output from the correlation processor 28 is therefore a series of complex phasors representing the phase and amplitude of the received signal over each successive integration time. The correlate, integrate and dump process is described elsewhere herein as a correlate and dump process, and the processor carrying out the process is referred to as a correlation processor.

After sampling signals from a MS received by the antennas for a predetermined number of dwell times within a total sampling time, a bearing estimation circuit 38 estimates the bearing of the MS using a spatial discrete Fourier Transform (DFT) as described above.

In this embodiment, array element sampling is cyclic and not simultaneous. This advantageously permits a single feeder cable and receiver chain to be shared between all four array elements and therefore a significant cost saving.

Doppler-induced or Carrier-offset-induced Bearing Bias

Figure 4:
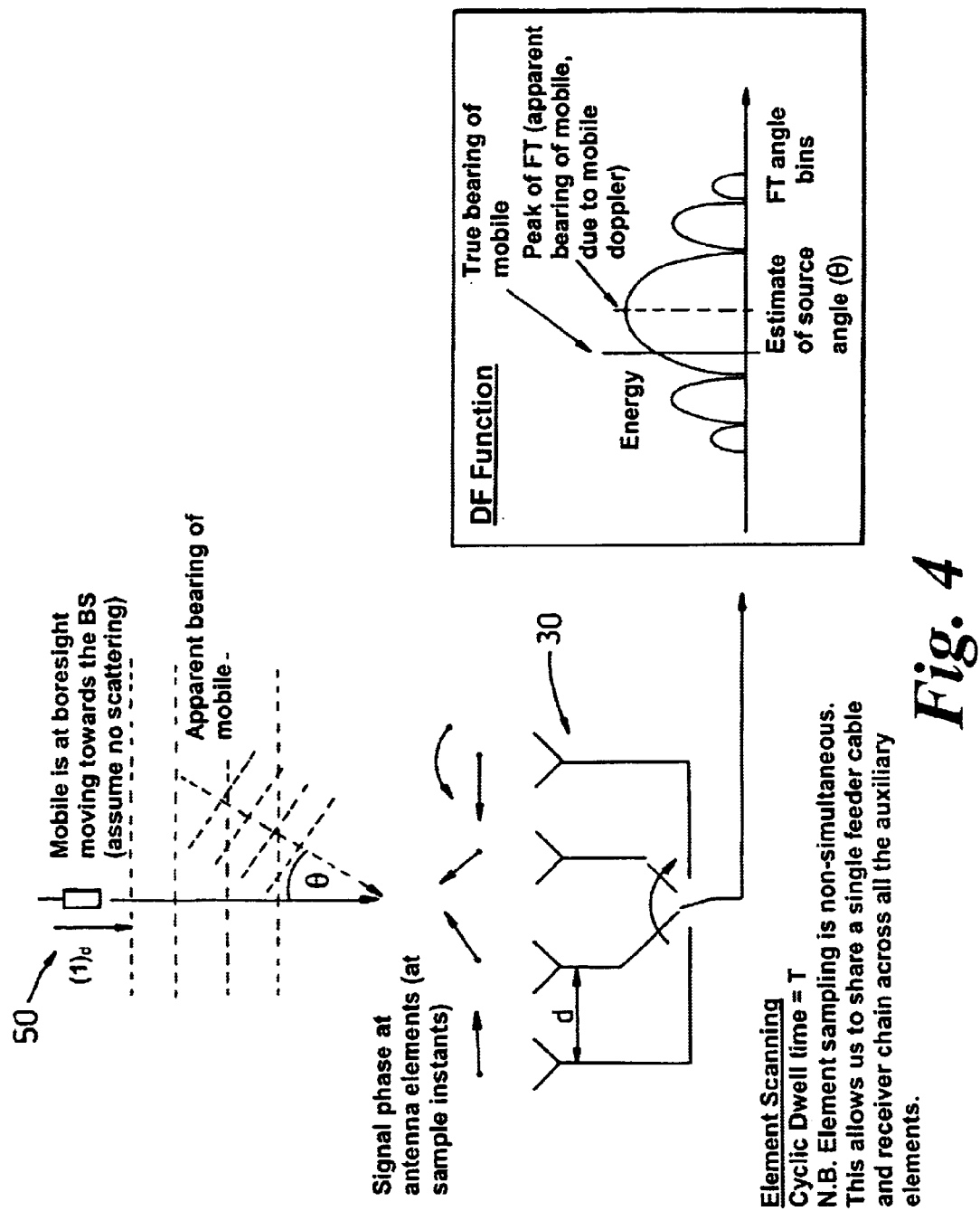
FIG. 4 illustrates the source of bearing bias due to Doppler frequency offset in a multi-element antenna sampled through a commutating switch as in a further embodiment of the invention.

The reason for the Doppler-induced or carrier-offset-induced bearing bias with the commutating architecture is illustrated in FIG. 4, where we see a MS 50 located at boresight of a commutated array 30, with a dwell period of T on each antenna array element. For simplicity the mobile is assumed to be located in a scatterer-free environment, and is moving towards the array (with no carrier offset) such as to give a Doppler offset of $\omega_d$ radians per second. (The same effect could be generated if the mobile is stationary, but is transmitting with a carrier offset of the same angular frequency. This can be as high as +/−150 Hz at 1.9 GHz and +/−300 Hz at 800 MHz).

The complex phasor representing the phase of the signal waveform received at each antenna element is evaluated by correlating the received waveform with the reference signal over the dwell time. (In practice the correlation time may be slightly shorter than the dwell time, for example to allow switching transients to settle. However, the correlation time should be as long as possible within the dwell time for increased accuracy). The reference signal is usually a nominal local replica of the data-modulated MS signal (depending on the type of radio telecommunications system). For example in a spread spectrum system such as CDMA the reference signal is a spread spectrum replica. In order to be able to extract communications data from the MS signal, in certain systems such as FDMA the BTS may track the frequency of the MS by varying the frequency of the replica signal (or LO) in known manner. The frequency of the reference signal used for direction finding may therefore vary as a result. However, at any time there may still be a residual carrier offset and/or a Doppler shift component in the actual MS signal received at the DF antenna, which will then vary slightly from the frequency of the replica reference signal. In a CDMA system the BTS reference signal frequency cannot track a MS frequency in this way because one BTS receiver chain receives signals from more than one MS.

The bearing estimate depends, as set out in equation (1), on the wavelength (frequency) of the signals received at the antenna elements and the relative phase of the waveform at each antenna element. The Doppler or carrier frequency offset is too small to cause any significant error directly by affecting the wavelength used for calculating MS bearings but it can lead to errors in estimating the relative phase at each antenna element.

When a received waveform is compared with the reference signal over the dwell time, any frequency offset leads to a progressive rotation of the phasor representing the relative phase of the received waveform at any instant during the dwell time, but the correlation integration and dump process produces an average phasor over the length of the dwell time. The dwell time must therefore be selected to be long enough to obtain an adequate CNR but short enough to avoid excessive phasor rotation. A suitable dwell time in a CDMA system is therefore the modulation symbol period.

If received waveforms at each antenna element are correlated simultaneously with the reference signal, no error due to frequency offset arises because all the waveforms undergo the same phasor averaging process. However, if waveforms from different antenna elements are sampled and correlated during successive dwell times, a further progressive rotation of the phasor representing the received waveform relative to the reference signal occurs due to any frequency offset, leading to a systematic error in the phasor estimate resulting from the correlation in non-simultaneous dwell times.

So if the MS is moving towards the array, even with the mobile located at boresight, as the commutator switches from element to element it sees a phase shift of the incoming signal of $\omega_d T$ radians (assuming an equal inter-element spacing), which the DF processor (DFP) misinterprets as meaning that the mobile is actually located at bearing θ, the bearing which would give the same phase shift per array element.

As described above, the phase shift per element is known to be:

$$\text{Phase shift} = (2\Pi d/\lambda)\sin\theta \quad (2)$$

The phase shift per element due to Doppler shift for a moving MS is $\omega_d T$ and so the error in the bearing θ due to Doppler shift is the solution (for θ) of:

$$\omega_d T = (2\Pi d/\lambda)\sin\theta \quad (3)$$

Continuing consideration of the simplified scatterer-free scenario, let us calculate how much Doppler/carrier frequency offset we can withstand for a typical array configuration whilst still remaining within our error budget. As described above, in an urban scenario the FCC mandate allows a maximum bearing error of about 4.8°. Doppler and carrier frequency offset is only one source of bearing error and so we estimate that Doppler and carrier offset must cause less than about 1° bearing error in an urban scenario. We assume a total aperture of the 4-element DF array of 3λ with a uniformly-spaced array, such that the interelement spacing is λ. We also assume that the dwell time on each element is equal to one symbol period (256 chips in an IS-95 system), since this should give us adequate CNR to minimise error due to noise and interference. What does 1° bearing error correspond to in terms of Doppler frequency? For this interelement spacing, 1° (0.0175 radians) of bearing error corresponds to 2Π(0.0175)=0.11 radians (6.3°) phase shift per element (since sin θ≈θ). Setting T=208μs, this gives us a maximum $\omega_d$ of 528 rads$^{-1}$, and hence an $f_d$ (frequency offset) of 84 Hz. Thus, if our combined (Doppler and carrier) frequency offset is equal to 84 Hz, a DF not incorporating frequency offset correction will return a 1° bearing error for a mobile located at boresight. At a carrier frequency of 1900 MHz this corresponds to a mobile speed of approximately 48 km/h.

Correcting for Doppler-induced Bearing Bias—
Method 1

If we know the amount of Doppler or carrier frequency offset of the signal, then according to an embodiment of the invention a remedy is to apply a phase-rotation correction to the complex phasors obtained from waveform samples across the elements in order to 'unwind' the frequency offset. If we carry out an exact element-by-element correction, then we will get back to an unbiased bearing estimate.

We can estimate the frequency offset of the signal by observing the complex phasors derived from a train of consecutive time samples on any one antenna element (the sampling period in the embodiment described above will of course be 4T, as we only return to the first element after every 4T seconds). We carry out a DFT (or FFT, treating DFTs and FFTs here as being synonymous, to all intents and purposes) of these complex phasors, which represent the progressive rotation of the phase of the received waveform at the selected antenna element relative to the reference signal, which is of known frequency, and the DFT output bin or bins with the largest magnitude indicates the frequency offset of our source. We must use a large enough DFT such that the frequency resolution is good enough to minimise any residual bearing error after Doppler correction. That is, if our frequency estimate of the source is somewhat crude (i.e. too coarsely quantised by the DFT) then there will be a small residual error after bearing correction. Interpolation may also be used.

Once the actual frequency of the signal received from the MS has been evaluated, the phasor rotation resulting from the correlation of received waveforms on different antenna elements in successive dwell times due to any frequency offset between the received signal frequency and the reference signal frequency can be calculated. Corrections can then be applied to the complex phasors derived from different antenna elements in the successive dwell times during each sampling time in order to eliminate bearing bias due to the frequency offset.

Correcting Doppler Spread and Carrier Offset—
Method 2

Figure 5:
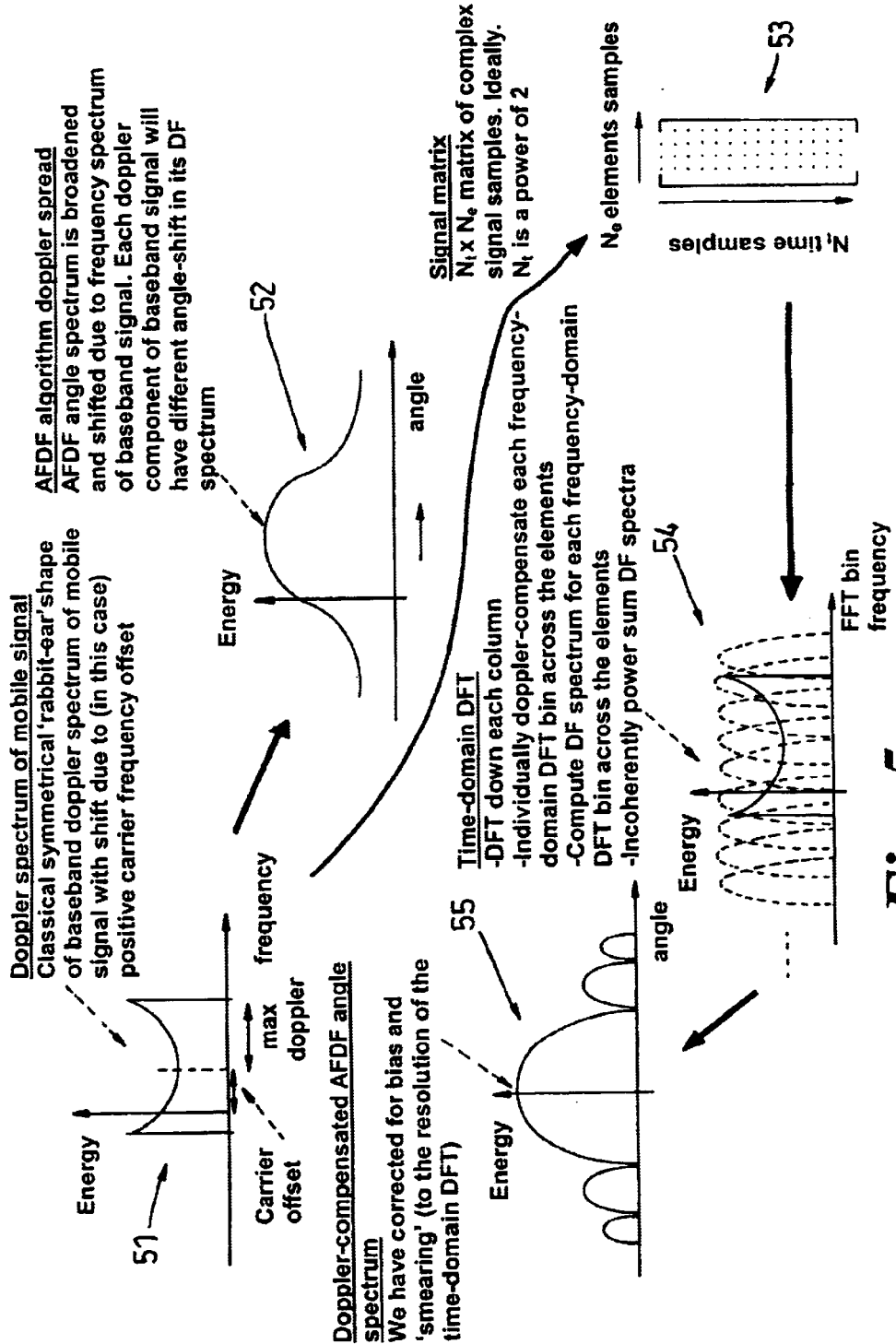
FIG. 5 illustrates the correction of Doppler frequency spread according to a further embodiment of the invention.

Of course, in practice we are unlikely to have a benign scattering environment, but rather we would expect the MS to be encircled by a ring of scatterers. In particular, this is likely to be the case in an urban environment where each signal from a MS will probably actually be seen by the BTS as emitting from a tight ring of closely-spaced scatterers around the MS, as the MS signal reflects from nearby buildings and the like. If there is a large number of scatterers, then at a BTS DF array this would lead to the received signal Doppler spectrum having the well-known symmetrical 'rabbit-ear' form of the classical 'Clarke' or 'Jakes' spectrum (Clarke R. H.: 'A Statistical Theory of Mobile-Radio Reception' The Bell System Technical Journal, July–August 1968 pps. 957–1000; Jakes W. C. (Ed): 'Microwave Mobile Communications' AT&T 1974, reprinted IEEE 1994) as shown in FIG. 5. This Doppler spectrum has a maximum Doppler frequency which is a direct function of the mobile speed. If there is any MS Tx (transmission) carrier offset, then this will additionally shift the whole spectrum either up or down in frequency, commensurate with the amount of carrier offset. If we use the uncorrected averaged Fourier Transform direction finding (AFDF) technique described earlier (and average over a large number of samples in time), then there will be a 'smearing' of the DF function peak due to the Doppler spread, and a bias due to the carrier offset, as described earlier. Of course, if the real-life Doppler spectrum is not totally symmetrical, then this asymmetry will introduce a bearing bias also.

In FIG. 5 we illustrate how, according to a further aspect of the embodiment described above, we correct for Doppler spread using a technique which is basically a generalisation of the Doppler correction method (Method 1) which we described above for the single-frequency Doppler offset case.

FIG. 5 relates to reception by a four element DF antenna in which signals are sampled sequentially during dwell times T at the antenna elements using a commutating processor architecture. Successive sets of four samples are taken during successive sampling times of duration 4T.

Plot 51 in FIG. 5 shows the rabbit-ear Doppler-spread frequency spectrum received from a moving MS, plotted in terms of energy density vs. frequency. The spectrum is additionally shifted due to (in this case) a positive carrier frequency offset.

Plot 52 shows the effect of applying the averaged Fourier Transform direction finding (AFDF) technique described above to the Doppler broadened spectrum, in terms of energy (intensity) vs. angle, or bearing. The AFDF angle spectrum is broadened and shifted due to the Doppler broadening and carrier offset of the baseband signal shown in plot 51. This is because each Doppler component of the broadened baseband signal generates a different bearing shift, or bias, in its DF spectrum.

According to a further embodiment of the invention, a correction can be made to reduce these errors.

Sampling and correlation with a reference signal of the signals received at the four DF antenna elements generates an array 53 of complex phasors. Each row of the array contains a set of four complex phasors, derived from waveforms during the four successive dwell times within one sampling time from the antenna elements. Each column of the array contains complex phasors derived from waveforms taken in successive sampling times from the same array element. The total number of rows in the array is predetermined as the number of sampling times within a total sampling time as in the AFDF technique described above. Accuracy can be increased by sampling waveforms over a greater number of sampling times. Preferably, the sampling time should be long enough to sample across fast fading of the signal transmission, but not so long as to sample across slow fading arising from movement of the MS. In general, the array contains $N_e$ columns ($N_e$=number of antenna elements) and $N_t$ rows ($N_t$=number of successive time periods). $N_t$ may typically be 128.

The array 53 of complex phasors is then processed. First a discrete Fourier Transform (DFT) is performed down each column to evaluate an energy density frequency spectrum for each antenna element. Each Fourier transform output bin thus contains a complex phasor representing the phase and amplitude of the component of the waveform received at that antenna element at the frequency of that bin. The frequency range of the components contributing to each bin are shown as dotted lines in plot 54 in FIG. 5. This step may be compared with the incoherent addition of information from successive waveform samples at the same antenna element involved in the AFDF method and Method 1 described above. In the present case however, the waveforms sampled successively at the same antenna element are coherently added.

When this procedure has been performed for each antenna element, a new array of complex phasors has effectively been generated, having $N_e$ columns, again representing the antenna elements, and rows corresponding to the Fourier transform output bin frequencies. Since each row corresponds to a known frequency, the complex phasors across each row can be compensated, or corrected, to remove errors due to the phase rotation caused by the combination of frequency offset and successive sampling of the antenna elements as described above in relation to Method 1.

A DF spectrum is then computed across each row of the complex phasor array, ie, for each frequency component of the waveforms received at each antenna element, using a spatial Fourier Transform as described above.

In the same way as in the AFDF technique the DF spectra for all of the frequency-domain array rows are incoherently power summed to generate a Doppler-compensated AFDF bearing (angle) spectrum, in which we have corrected for bias and Doppler spreading to the resolution of the time-domain DFT. A plot 55 of the corrected spectrum in terms of energy vs. angle is shown in FIG. 5. In a preferred embodiment it may be advantageous before the step of summing the FFT or DFT output bins to throw away bins which are assessed only to contain noise, as they would only degrade the overall spatial power spectrum. The selection of bins containing only noise may be achieved using a thresholding technique. This would be a way to achieve some coherent advantage but requires some prior knowledge of the expected Doppler spread characteristic to control the thresholding strategy.

Correcting Doppler Spread and Carrier Offset—Method 3

An alternative consideration of the principle of this correction technique is as follows.

The sampling dwell time, T, is the time we dwell on any one antenna element. We also need to define the following:

$\theta_o$=Spatial Phase Rate (radians) between elements due to bearing offset from broadside.

T=fundamental sampling period, ie. interelement dwell time (assuming sampling is done spatially first).

$\omega_o$=Doppler phase rotation rate, defined in terms of radians per dwell time T $N_e$=Number of array elements, so the time period between consecutive samples on the same antenna element $N_e T$ $N_t$=Number of points in time domain DFT The sampled matrix of space-time signals, x (n,t) is then (for a given single source plane wave of angle offset $\theta_o$ and Doppler phase rate $\omega_o$):

$$x(n,t)=\exp(j(\theta_o+\omega_o)n)\exp(jN_e\omega_o t)\exp(j\phi_o), n=0, \ldots N_e-1, t=0, \ldots N_t-1 \quad (4)$$

After 2D Fourier transformation we get a space time spectrum of the form $$A(\theta, \omega) = \frac{\sin(\pi N_e(\theta - \theta_0 - \omega_0))}{\pi N_e(\theta - \theta_0 - \omega_0)} \cdot \frac{\sin(\pi N_t N_e(\omega - \omega_0))}{\pi N_t N_e(\omega - \omega_0)} \cdot \exp(j\varphi_0) \quad (5)$$

where $\phi_o$ is a measure of the phase of the arriving signal. Equation (5) is a continuous function of $\theta$(for $-1<\theta<1$) and $\omega$(for $-1<\omega<+1$). In the presence of two multipaths with different Doppler shifts or bearings there will be a coherent addition of the multipaths in the DFT output.

Figure 6:
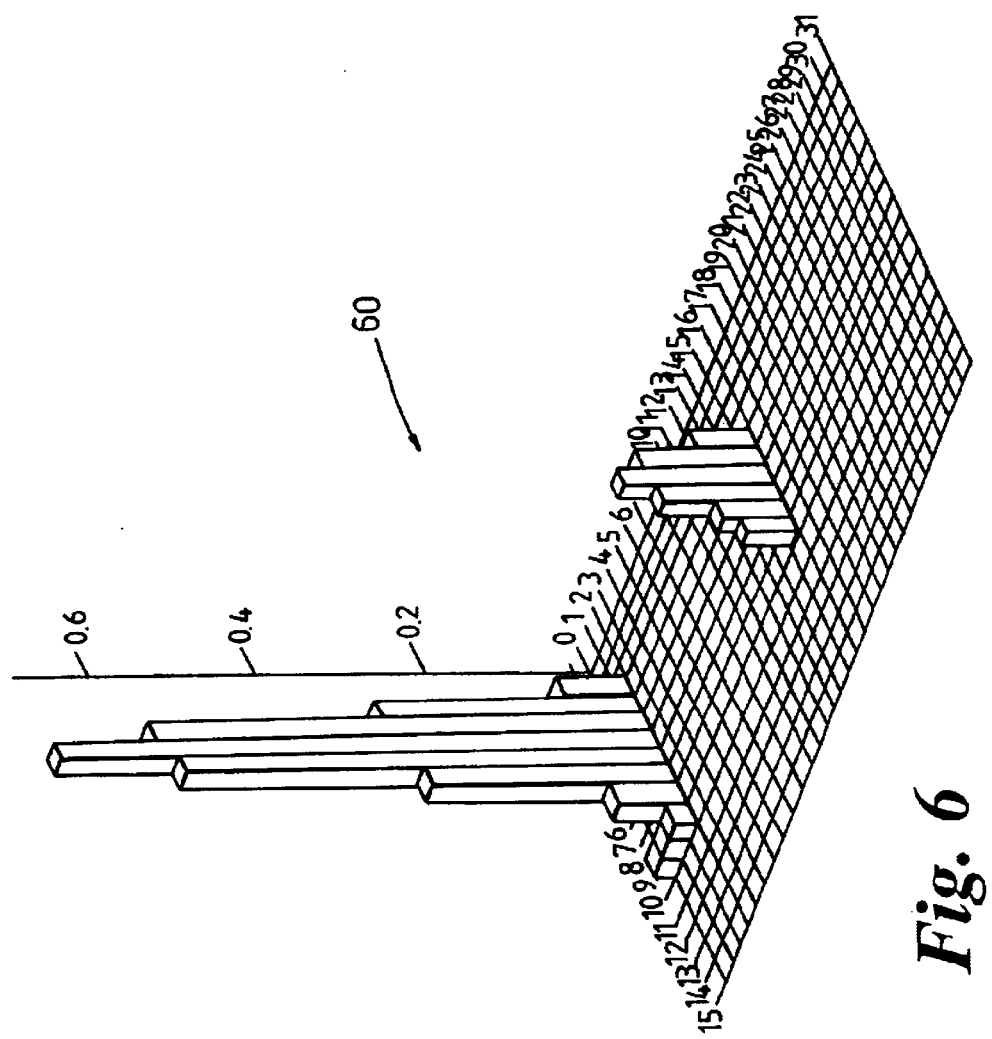
FIG. 6 is a space-time spectrum plot for two multipath signals with different Doppler offsets and spreads and the same angle of incidence.

FIG. 6 shows a space-time modulus spectrum 60 in a 4-element array using a 32 point DFT in the time domain. The bearing direction is computed at 32 points on the positive half interval. There are two multipaths, both at the same bearing, equivalent to a spatial phase rate of $+\Pi/2$ (¼ of the whole range) but one with zero Doppler offset, and the other having a positive (Doppler) frequency offset equivalent to half of the sampling rate (allowing for the space sampling taking 4 dwell periods (4T) between each channel time sample). That is, the true frequency is 0.125 of the sampling rate but since the sampler dwells at 4 elements for each time sample the DFT sees a frequency of 4 times the real frequency.

The apparent source bearing of the second multipath is seen to be shifted by its Doppler such that its bearing indication is biased.

The Doppler-induced bearing spread can be corrected by aggregating the bearing-frequency plot down onto the zero Doppler axis, correcting for the frequency, i.e. what was discussed in methods 1 and 2. An alternative and equivalent approach is to draw slant lines on the plot in FIG. 6 and accumulate power (or energy) along them. The lines are the loci of constant bearing. These loci are linear (straight lines), because we have already shown that the bearing bias is a linear function of Doppler. This is only true because we are working in the "spatial Phase Rate" domain, rather than the true bearing angle domain. After accumulating power along the loci, we choose the one with largest value. This gives us our estimate of "spatial Phase Rate", which we then convert to a bearing.

Given that this process is possible, the next problem to be addressed is how to calculate how much resolution should be offered in the frequency domain to combat bearing estimation errors. If the worst situation is that a source can fall halfway between two frequency bins and thus cause erroneous bearing corrections, one simple criterion might be that twice the difference in bearing correction offered by two adjacent frequency bins should be less than the bearing accuracy that the system is specified to achieve.

The frequency spectrum $A(\theta, \omega)$ is quantised in increments of one frequency cell by the DFT. From equation (5) it can be seen that $\theta$ and $\omega$ are numerically to the same scale, given that $\omega$ is measured in terms of phase rate per latency between resample on each channel. Consequently the bearing bias difference between two DFT bins is related to a spatial phase rate by the dimensionless ratio $$\Delta_\theta/\theta_{CONV}=1/(N_t) \quad (3)$$

where $\theta_{CONV}$ is the conventional (3 dB) beamwidth of the antenna. When measured in units of phase gradient, we can define the 3 dB beamwidth as being equal to the "bearing" (i.e. phase shift per element) at which a beam pointed at boresight would give zero output (i.e. angular offset of first null). Thus for $N_e$=2, 4, 8 . . . , 3 dB beamwidth=Π, n/2, n/4 . . . etc. So given that the conventional beamwidth of the antenna is 2Π/$N_e$ (measured in units of phase gradient) the bearing shift between frequency bins is equal to the conventional beamwidth divided by the number of points in the DFT. So, for example, if we were aiming for an accuracy of 1/10 of the conventional beamwidth in the space domain, we would need at least a 10 point DFT so as not to increase bearing error. In practice this would be implemented as a 16-point transform.

Thus compensation of bearing error due to a combination of sampling dwells and Doppler or carrier frequency offsets to eliminate Doppler related bearing bias is achievable using a small size DFT in the time domain, such as 16 point. It will also be necessary to ensure that Doppler in, frequencies are not aliased since the equivalent sampling rate on each channel is only 1/$N_e$ times the real sampling rate if, as is assumed here, the sampling is done with fastest spatial priority.

This treatment (Method 3) is slightly different from those described above (Methods 1 and 2) for correction of Doppler-induced bearing bias in that instead of individually carrying out frequency offset corrections across the array for each time-domain DFT bin, it instead describes a two-dimensional DFT process. The (Doppler-corrected) DF function at each estimate of mobile angle is then obtained by drawing slant lines on the 2-D DFT plot and accumulating power along them. An alternative and more exact technique is to carry out the unwinding of the Doppler for each individual DFT bin (phase sample), as described as Methods 1 and 2. The alternative treatment (Method 3) is useful however in that it presents the problem in a dimensionless form whereby, for example, array beamwidth is treated in terms of phase slope across the elements instead of absolute angle. It goes on to calculate how many consecutive time-domain samples (hence time-domain DFT points) are required in order to guarantee that we achieve some target residual Doppler bearing error. The conclusion is that if we want to achieve an accuracy equal to 1/x of the conventional beamwidth (at boresight) of the array, then the number of time-domain samples over which we need to DFT, $N_t$ is given by:

$$N_t = x/2$$

So for example, if we wish to correct Doppler to an accuracy of 1/10 of the conventional 3 dB beamwidth, we need to DFT over 10/2=5 samples (in practice we would use an 8-point FFT here). Similarly, if we wish to achieve 1° bearing accuracy for a 20° beamwidth array, following the estimate described above of Doppler offset needing to be correctable to less than 1° bearing error in an urban environment to meet the FCC E911 mandate, we will require 10 samples (16-point FFT). In a rural environment, where cell diameters are typically much larger than urban cells, lower bearing error is required if the FCC E911 mandate is to be met. If we therefore estimate that in a rural scenario 0.24° bearing error due to Doppler offset is permissible, we can estimate that for 0.24° bearing accuracy with the same array as described above we will require approximately 40 samples (64-point FFT). In each of these cases the extra processing load implied for the Doppler-correction process is minimal compared to the size of the zero-padded DFTs we will be carrying out in the angle (spatial) domain (see FIG. 2). This is because to generate an angular DF function with sufficiently good angle quantisation we would use an FFT of the order of 512 or 1024 points.

Antenna Design: Non-uniform Array Element Spacing

In this section we consider performance limitations due to multipath, assuming no noise, simultaneous element sampling (i.e. no Doppler bias issues) and perfect array calibration. We concentrate on performance in the urban channel to select suitable array parameters to cope with multipath.

A key issue is that of averaging over mobile movement, in order to cycle through the relative phases of the various multipaths. It is important in a multipath (hence fading) channel to obtain as many independent received samples as possible over the signal time-fading envelope. If we do not do this, then we will see large and unavoidable bearing estimation errors due to multipath arrivals which, in average terms, may be quite weak. Even if we have perfect averaging over mobile movement, then if we have poor resolution in bearing (due to a narrow array aperture), we will still get errors in our AOA estimate. If we have a large beamwidth then we cannot resolve two closely-spaced clusters (let alone the sources in each cluster). We will get the situation whereby the second cluster will 'pull' or 'drag' the DF estimate towards itself, to an extent dependent upon its mean power. Thus we would like to have a large array aperture, to give us a narrow array beamwidth, in order to individually resolve the clusters and select the true direct-path cluster with no dragging.

Even with a narrow beamwidth, we must take account of array sidelobes. This is because a secondary cluster, widely spaced from the main one but falling in an array sidelobe, can also drag the DF bearing estimate, even though there is no danger of selecting this secondary cluster as the bearing estimate (if our averaging is good). Thus, as well as designing an array with a narrow beamwidth, we would like to minimise the sidelobes.

The final constraint we have is that we would like to minimise the number of array elements, as this has a cost impact. Thus, we would like a large aperture, but with few elements and low sidelobes. These are in general conflicting requirements, and so we must find some suitable compromise. In order to maximise aperture with a minimal number of elements we can choose a large aperture array with many closely-spaced elements (a filled array), and then thin it by removing some of the elements. However, this has the undesirable effect of increasing the sidelobe level compared to the filled array.

Figure 7:
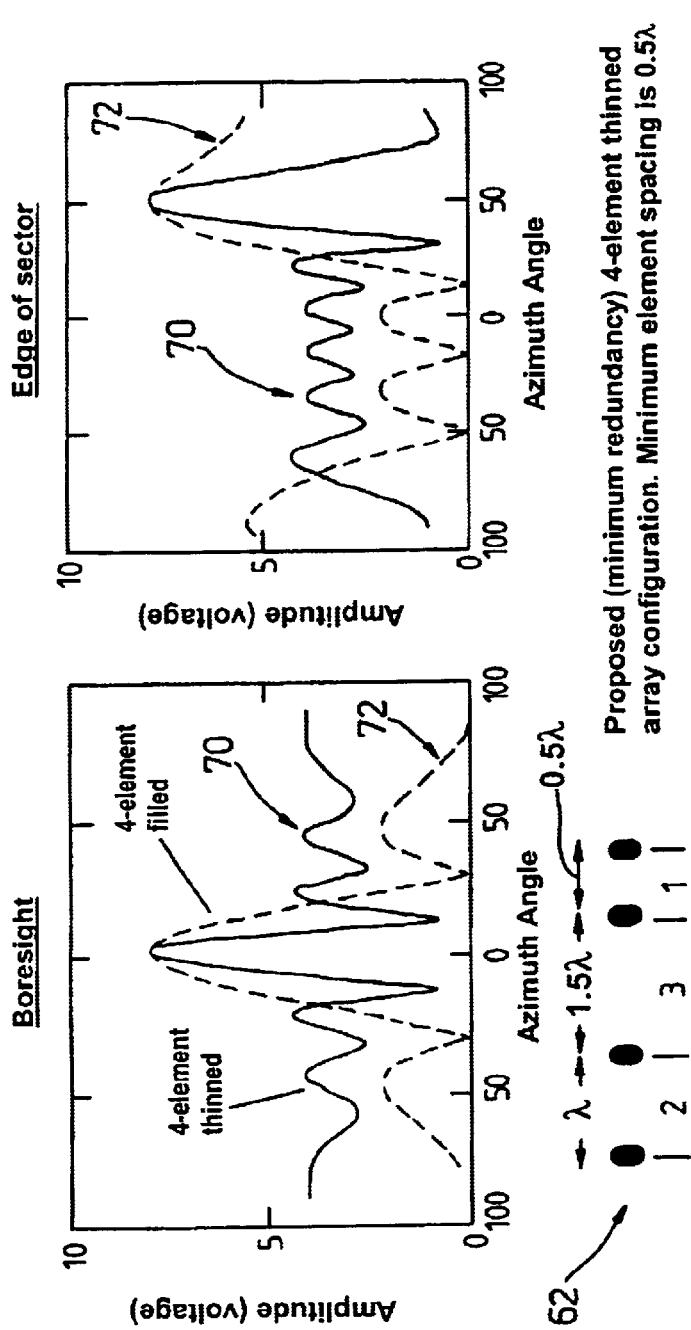
FIG. 7 illustrates a four-element thinned (non-constant element spacing) array according to a further embodiment of the invention.

So our preferred DF array configuration is to use a thinned minimum redundancy spacing, with elements at 0, 1.0, 2.5, and 3.0λ, as illustrated at 62 in FIG. 7. FIG. 7 also shows the example beam patterns 70 for this configuration, and compares them to the beam patterns 72 for a conventional equally-spaced linear array of the same number of elements.

Doppler in a Non-uniformly-spaced Array

Another problem with the 'drawing slant lines' technique of Doppler frequency correction mentioned above (Method 3) occurs when we have non-uniform antenna element spacing. In this case, the effect of Doppler or carrier-induced frequency offset is not quite so straightforward, as it leads to a 'warping' or distortion of the DF function instead of the straightforward bearing-shift of FIG. 4.

To correct for the Doppler for each time-domain DFT bin (phase sample) in this case we must use the unwinding technique (Methods 1 and 2), where the phase-shift of the unwindinig between consecutive elements is proportional to the spacing between them. In principle, we can precisely correct for Doppler in this way. Alternatively, for all methods, when doing our spatial DFT we can zero pad for absent elements.

Accuracy Requirement in the Rural Scenario

Most of the above discussion has revolved around the urban scenario where, as indicated above, our error budget fit allows for 4.80 rms bearing error. However, in the large-cell rural environment, where the cell radius may be as high as 10 km, we must achieve an angular accuracy of 0.48° rms error to meet the FCC E911 mandate. Applying equation (1) this indicates that we need to achieve a phase accuracy of around 9° between the end elements of a 3$\lambda$ array. This could prove very challenging, especially when we take into account the effects of phase errors due to filters and cables, as well as the effects of noise and interference.

Figure 8:
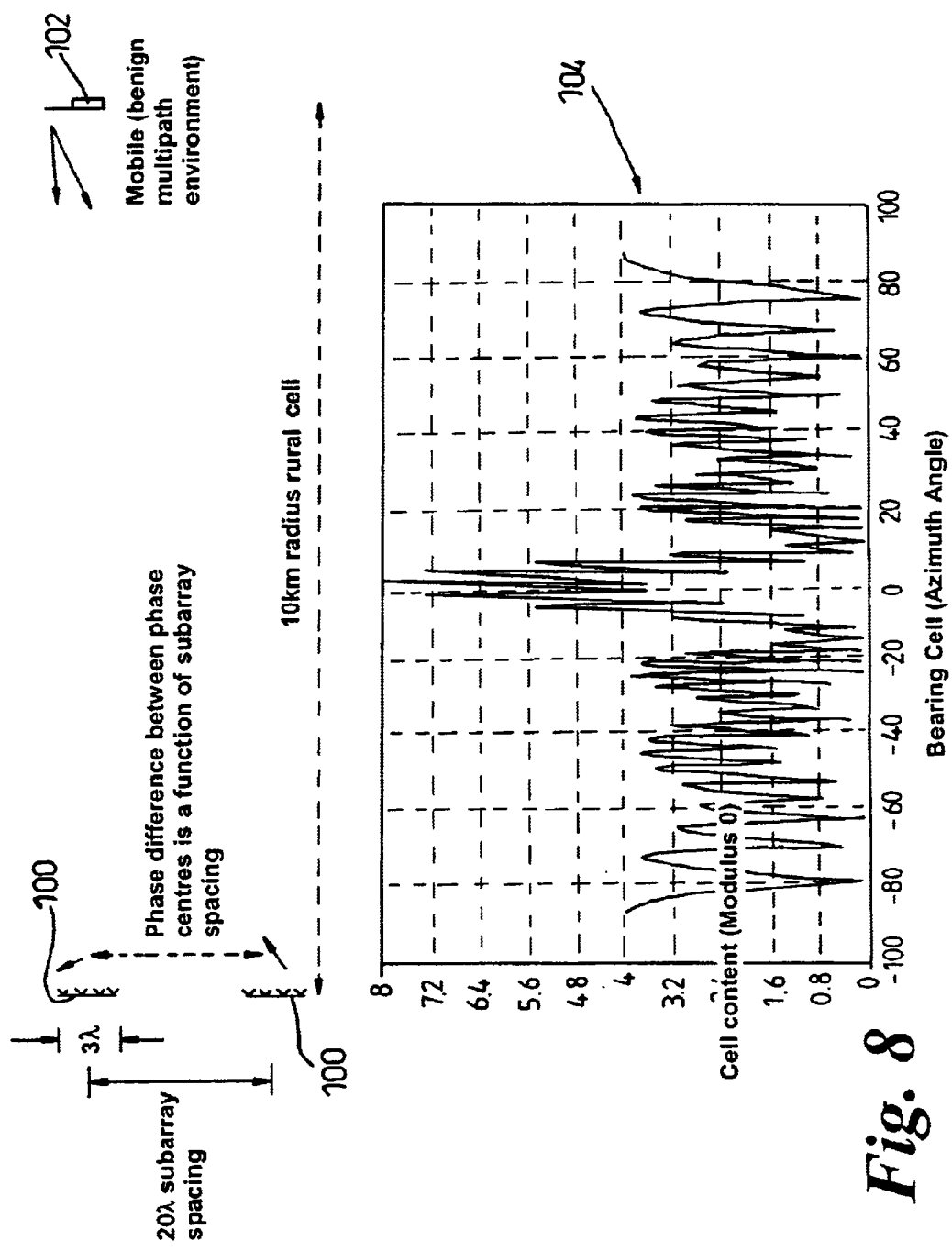
FIG. 8 illustrates a direction-finding array comprising two widely-spaced multi-element subarrays according to a further embodiment of the invention.

It is proposed that in the large-cell-radius rural scenario we increase the 'effective' array aperture to around 20$\lambda$ (3 metres at 1900 MHz) as illustrated in FIG. 8. We do this by deploying two 3$\lambda$ DF arrays 100, accurately aligned to point in identical directions, but with a 20$\lambda$ separation between their phase centres. Two single elements spaced by 20 wavelengths would produce ambiguous indications of the position of an MS 102 every 3°. However because we are using two arrays, rather than single elements, we can avoid these ambiguities. This is because two arrays of the type proposed, used together as a pair, would ensure an accuracy of at least 1.5° between them. This would then resolve the 360° ambiguities of the high accuracy measurement achieved by comparing the mean phase of the widely spaced sub arrays. In effect, we can use each array individually to give a coarse angle estimate. We then look at the difference in mean phase between the individual arrays to give a fine angle estimate. This fine angle estimate is highly ambiguous, as there are many possible values it can take, all spaced by about 3°. However, the coarse estimates tell us which one of the ambiguous fine estimates is the correct one.

Another way of looking at this is to consider the combined beam pattern of the composite two sub-array system. In FIG. 8 we show a plot 104 illustrating that the composite (boresight) beam pattern has a very narrow central main lobe. The ambiguous lobes are due to the widely spaced arrays suppressed by the inherent beam pattern of each sub-array. Assuming accurate alignment and calibration, such an arrangement will give us an extremely accurate bearing estimate, since bearing estimation accuracy is a direct function of main lobe width. We are not too concerned about the high sidelobes of such an arrangement, since in the rural scenario we expect the scattering to be benign. However, these sidelobes rule out this configuration as being unsuitable for increasing angular accuracy in the urban environment.

The invention is not limited to the embodiment of two 3$\lambda$ arrays separated by 20$\lambda$. Many other combinations of dimensions are possible, as long as the widths of the individual arrays are large enough to give sufficient bearing location accuracy to remove the ambiguities due to the wider spacing between the arrays.

Limits Due to Array Calibration

Even with plane-wave sources, high CNR and zero mobile Doppler, we can still make errored bearing estimates due to imperfections in our DF equipment if these imperfections are not perfectly calibrated out. Some possible sources of such error are:

Differential phase errors in filters

Phase errors at array caused by adverse weather conditions (e.g. snow build-up on radome)

Incorrect alignment of antenna arrays

Antenna tower twisting, due to the effect of wind, temperature cycling, etc.

In principle, none of these phenomena need cause any bearing error, as long as they can be correctly calibrated out at sufficiently frequent intervals. Naturally, it highly desirable that this can be done wholly automatically without the need for human intervention, as this would lead to much reduced network operation costs.

Embodiments of the invention provide a number of techniques for carrying out this calibration. For measuring filter/cable differential phase shifts we propose injecting a calibration signal into the receiver chain by coupling in a calibration signal close to each antenna element. The signal should preferably be injected as close as possible to each antenna element. This signal can be spread or non-spread, and can be tuned to any wanted carrier frequency in the received band. The principle benefit of using such a calibration source is that it is unobtrusive—that is, it will not affect any other part of the CDMA BTS or network. It is also visually unobtrusive.

It would be desirable to be able to apply a similar source such that it could also calibrate out any phase errors due to weathering or ageing. To do this we would require a near-field probe (transmitter), for example extended forward from the antenna facet on a support arm, such that the probe appears within the directional pattern of the individual antenna elements. Such a scheme may adversely affect the visual impact of the antenna facet. It would also be unable to account for any errors due to antenna misalignment or tower twisting.

To account for these latter two error effects (as well as other error effects), two possible techniques can be applied according to further embodiments of the invention. The first is an Autonomous Beacon Mobile (ABM). This is in essence a standard IS95 mobile handset, mounted remotely, and provided with a long-duration power source (e.g. solar powered with battery back-up). The ABM needs to be mounted at a known (i.e. accurately surveyed) location with benign scattering (e.g. on the top of a prominent high building or mast, clear of local scattering). Alternatively, the ABM can be mounted indoors, but with an external antenna which meets the above criteria. In order to reduce the effect of scattering, the ABM could use a highly directional antenna. However, this may be undesirable in certain applications because it would restrict the ABM to being used to calibrate only a single DF BTS. More desirable would be to place the ABM somewhere in a 3-way (or more) handoff area, using an omnidirectional antenna. This way it can be used to calibrate multiple BTSs. The ABM could also be used as an autonomous calibration tool for competitor position-location techniques such as time difference of arrival (TDOA), if such regular calibration should be needed.

To carry out a calibration, a call to the ABM is set up. The ABM incorporates circuitry to answer automatically, and to set up a dummy call. Whilst this call is in progress the DF processor at the BTS carries out a position location estimate, evaluating either or both of the bearing of the ABM and the round trip delay (RTD) from the BTS to the ABM and back. Any difference between the estimated position and true position indicates errors in the DF receiving equipment, which can then be calibrated out using a suitable calibrator. For example, measured errors in relative phases across the array can be stored in a lookup table and used later to make calibration corrections for true emergency calls. Excessive errors are an indication of equipment fault, and can be used to alert maintenance personnel.

The main benefit of the ABM is that it is simple and non-intrusive, since calls placed to the ABM provide minimal interference to the rest of the network, slightly reducing the system capacity merely for the duration of the call (i.e. only a few seconds). Of course, calls to the ABM could be restricted to off-peak hours. The main disadvantage of using ABMs is that the operator needs to obtain sites at which to locate them. If we are able to place every ABM in (or close to) a 3-way handoff area, then we will need an average of one ABM site for every BTS cellsite (for a trisector system).

A solution to this site-acquisition problem is to place beacons actually at the cellsites themselves. Of course, such a beacon cannot be used to calibrate its own cell, but it can be used to calibrate the surrounding cell sites, if it has sufficient transmit power. An added advantage is that the scattering environment is almost guaranteed to be benign, since cell masts are generally located clear of local scatterers, and the range will be high since there should be good line of sight (LOS) coverage to surrounding sites. However, the ABM concept cannot necessarily simply be extended to positioning an ABM at each cellsite. For example, if we used a ABM located at a cellsite in a CDMA system, then in order to avoid interfering with its own cellsite the ABK would be power-controlled down to extremely low power levels. It would then be undetectable at the surrounding cellsites. Therefore, in order to be able to use a cellsite beacon (CSB) with sufficient power we need to give it a carrier frequency within the CDMA band (for licensing reasons, and so that it can be detected by the DF systems it is being used to calibrate), but away from all of the active channels being used by that cellsite. In a preferred embodiment the CSB therefore transmits a narrowband carrier within one of the operator's guard-bands (i.e. at the edge of the licensed allocated Base Station Receive band). This is proposed in terms of a CDMA system but may easily be extended to other systems.

How powerful can we make this narrowband CSB carrier? The main restriction on CSB transmit power in a CDMA system is identified to be due to the specification for adjacent-channel single-tone desensitisation of a BTS receiver (as discussed in more detail below). To avoid desensitising the BTS receiver it is proposed that we restrict the tone transmit power to −12 dBm. Based on a 10 Hz receiver bandwidth at the DF receiver to be calibrated (i.e. coherent averaging of the received calibration tone over 100 ms), analysis suggests that we have an allowable pathloss of around 148 dB for the calibration path, compared to around 154.1 dB for the mobile-base link. Although the cellsite to cellsite distances are around twice as high as the maximum mobile to cellsite distances (giving an extra 10.5 dB pathloss for an $r^{3.5}$ pathloss law), the losses (typically totalling around 21 dB) due to factors such as shadowing and building penetration will on the whole be totally absent (due to the beacon positioning). Based on an overall 4.4 dB advantage, the CSB technique is therefore viable, and would advantageously be a cost-effective technique for calibration of DF position-location systems.

Figure 9:
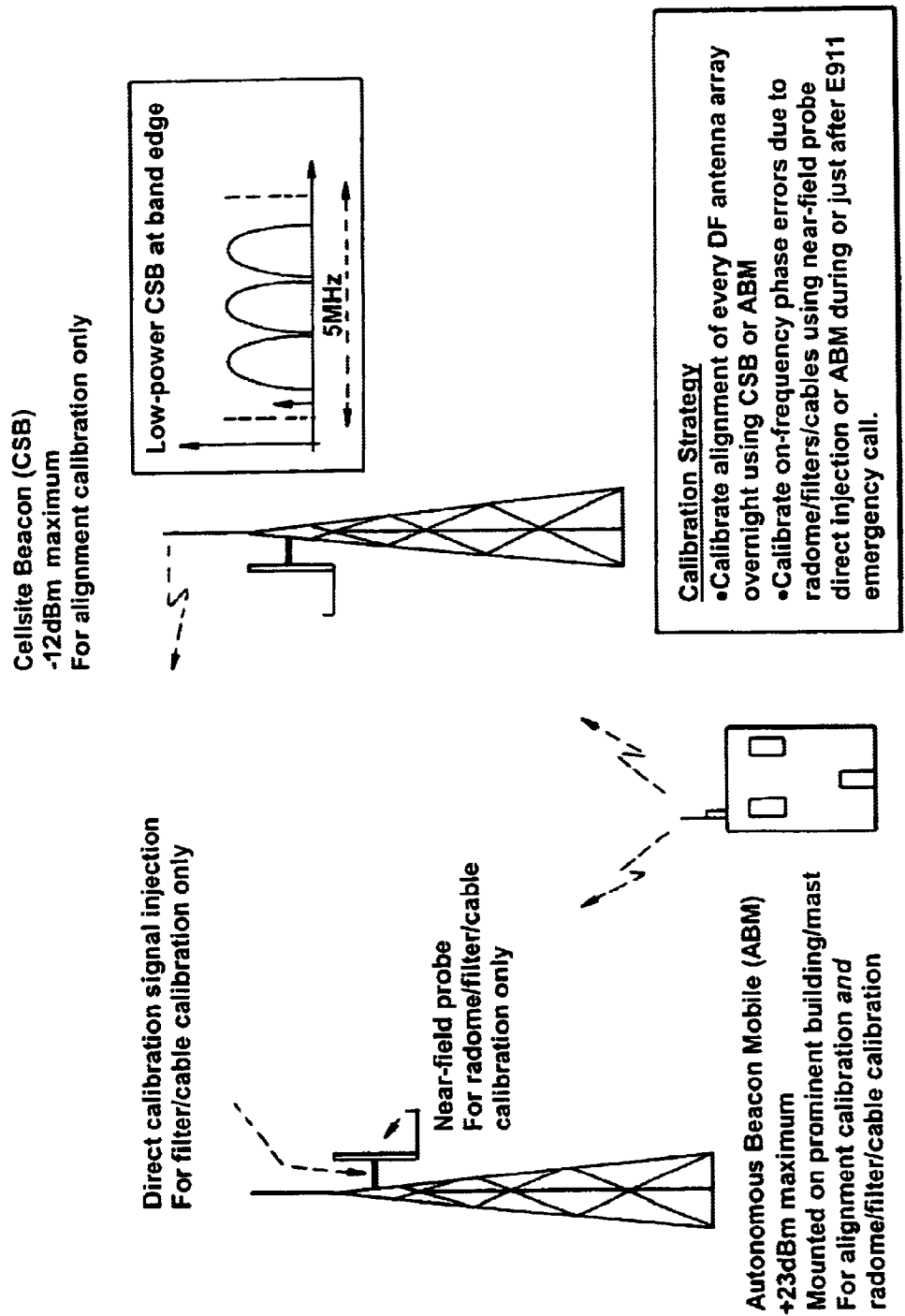
FIG. 9 illustrates several techniques for calibrating cell site direction-finding equipment, according to a further embodiment of the invention.

In FIG. 9 we illustrate the various techniques for calibration of the DF system. Some of the techniques are alternatives, and some are complementary. Thus any overall calibration solution can be tailored to the needs of the operator, and may vary within different networks and across a network.

For example, as part of an overall calibration strategy the following techniques may be used. Direct calibration signals 110 may be injected close to each DF antenna and/or each transmit/receive antenna to calibrate cables and filters coupled to the antennas. A near-field probe 112 may be positioned in front of each antenna for radome, cable and filter calibration. One or more ABMs 114 may be placed at accurately-known locations within the cell or sector covered by an antenna. The ABM transmit signal should not exceed a +23 dBm maximum and may be used for antenna alignment calibration as well as radome, filter and cable calibration. Finally, a CSB 116 may be placed at each cell site, having a −12 dBm maximum transmitted signal for this particular IS95 system. (Actual numbers might be different for a different system). This can be used for antenna alignment calibration only.

Advantageously, the CSB at a cellsite uses an omnidirectional antenna to ensure that its transmissions can be received by all neighbouring cellsites. The CSB antenna may additionally have a small vertical angle of coverage to maximise antenna gain. The CSB antenna should be positioned above or below the BTS antennas at its own cell site to reduce interference at that cell site. Thus, as illustrated in FIG. 9, the CSB antenna 118 may be positioned above BTS antennas 120 at the top of a cellsite mast 122.

In summary, an overall calibration strategy may, for example, be selected or designed so as to calibrate the alignment of all DF antenna arrays overnight using CSBs or ABMs, to calibrate on-frequency phase errors due to radomes, filters and cables using near-field probes or ABMs, and such errors due to filters and cables using direct signal injection, for example at regular intervals or during or just after emergency E911 calls.

Calibration Link Budget—Cellsite Bacon

According to a preferred embodiment described above it has been proposed that the cellsite beacon (CSB) transmit a continuous wave (CW) tone somewhere within one of the reverse link guard bands of a CDMA system. As this signal will be in the receive band of the receiver at the same cellsite or on the same mast (although not at the same exact carrier frequency) its power level must be low enough to not cause interference, intermodulation or compression.

The Base Station Specification (ANSI J-STD-019 (SP3383): 'Recommended Minimum Performance Standards for Base Stations Supporting 1.8 to 2.0 GHz Code Division Multiple Access (CDMA) Personal Stations' Jan. 12, 1996) sets the single tone desensitisation signal level to be −39 dBm at the Rx (receiver) input (causing a maximum 3 dB degradation). If we assume a 30 dB free space loss between the CSB transmit antenna and the BTS Rx antenna then this sets the CSB transmit power to reach this desensitisation level at −9 dBm. If we are to cause minimal interference then we should reduce this value by a small safety margin to say −12 dBm.

As this signal is only a beacon it could be CW, although it would be more robust if it were spread slightly. However as there is no modulation information the effective bandwidth of the DF receiver which is being calibrated can be very small. We do this by coherent averaging (matched filtering) of the received calibration signal in order to dig it out of the noise. 10 Hz is a suggested minimum value for this matched filter bandwidth. For even narrower-bandwidths we would need to start to concern ourselves with the phase noise of the CSM (cell site module) and DF receiver loss.

The overall noise figure of the E911 direction finding processor receiver of the embodiment described above is 11 dB. This is the figure for 1900 MHZ, which we consider as a worst case. If we assume we require a CNR of 3 dB (this with averaging should be adequate) then the power of the minimum detectable received signal is (−174 dBm +10*log (10 Hz)+11 dB+3 dB)=−150 dBm.

If we assume a 10 dB receive antenna gain (as above, for 1900 MHz) with no transmitter antenna gain and a Tx power of −12 dBm then the maximum allowable path loss is (−12 dBm −(−150 dBm)+10 dB)=148 dB.

How does this compare with the maximum allowable pathloss for the conventional reverse link? If we consider a maximum handset power of +23 dBm, a BTS sensitivity of −116.1 dBm and an antenna gain of 15 dB (1900 MHz), then this indicates a maximum allowable pathloss of 154.1 dBm, some 6.1 dB more than the maximum pathloss for the DF system. Furthermore, Tx–Rx range for the calibration system using CSBs will be about double that for the maximum mobile-base range, which for an $r^{3.5}$ pathloss law indicates a further 10.5 dB shortfall, giving a total shortfall of 16.6 dB. However, this does not take into account the extra margins allowed for the mobile-base link of, for example:

body loss (3 dB),
building penetration loss (10 dB),
Rayleigh fading margin (1 dB),
Variable Cell loading margin (1 dB), and
Shadow margin—Soft Handoff Gain (10.4 dB−4 dB=6 dB), giving a Total Margin of 21 dB When we take these margins into account (recognising that they will significantly limit cell sizes), we can see that the CSB-DF link has about an extra 4.4 dB in hand compared to the mobile-base link.

We thus conclude, based upon all of the above calculations, that even if we are restricted to a maximum CSB transmit power of −12 dBm, we should have an adequate received signal at the adjacent cell site in order to calibrate the DF receiver.

Overall Summary of the Embodiments

The FCC ruling states that in 67% of cases we must locate the MS with an error of less than 125 m. This leads to a bearing error requirement of around 4.8° rms in the 1 km cell urban scenario, and 0.48° rms bearing error in the 10 km cell rural scenario.

In the large-cell rural channel we do not expect the multipath to present a problem, but noise/interference and calibration errors could be problematic in light of the extra bearing accuracy requirement. Therefore we propose increasing the effective antenna aperture to around 20λ by use of a second array facet in every sector in order to achieve this additional required accuracy.

The commutating DF architecture necessitates the use of space-time DFT processing in order to overcome bearing errors due to mobile Doppler and carrier offset.

A calibration strategy has been described which makes use of directly coupled, near-field and far-field signal sources. This will allow us in principle to eliminate most sources of equipment error.

Hardware and Software Configuration

Figure 10:
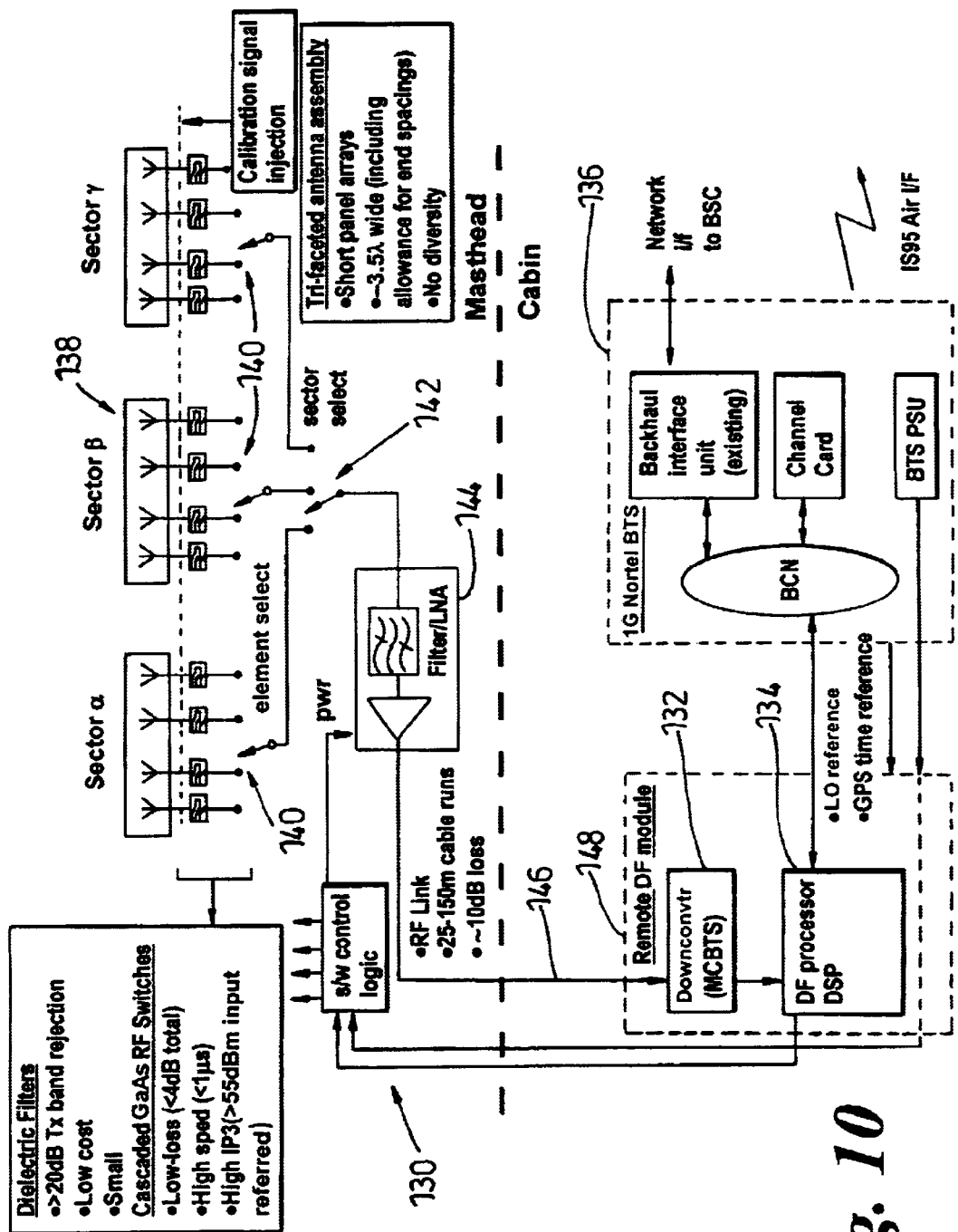
FIG. 10 is a block diagram of three direction finding antennas and cell site equipment according to a further embodiment of the invention.

A preferred embodiment for a DF/RTD E911 position location system is illustrated in FIG. 10. There are four main elements involved in such a product, namely:

i) Masthead processing 130
ii) DF Remote Enclosure (DFRE) radio frequency (RF) and analog to digital conversion (ADC) processing 132
iii) DFRE DSP hardware and software 134
iv) BTS and network software modifications 136

The uplink signal from the E911 call in our wanted sector (one of three at the cellsite in a conventional trisectored cell) is received by the four elements of 3λ-aperture array 138 (approx. 3.5λ total aperture when we allow for end-spacing). Each element is connected via a dielectric resonator filter to the input of a 4-way switch 140. The 4-way switch outputs are coupled to a 3-way switch 142 which allows us to select the wanted sector. These switches in combination thus allow us to switch any single element on any sector through a conventional filter/LNA (low noise amplifier) combination 144 to the RF feeder 146 leading down the mast to the DFRE (direction finding remote enclosure) 148. The DFRE carries out all of the RF and digital signal processing 132 associated with this DF/RTD technique, including the Doppler and carrier offset correction and antenna calibration 134, whilst at the same time communicating via the base station communications node (BCN) with any elements in the rest of the network (e.g. BTSs, base station controllers (BSC), mobile telephone exchanges (MTX)).

Figure 11:
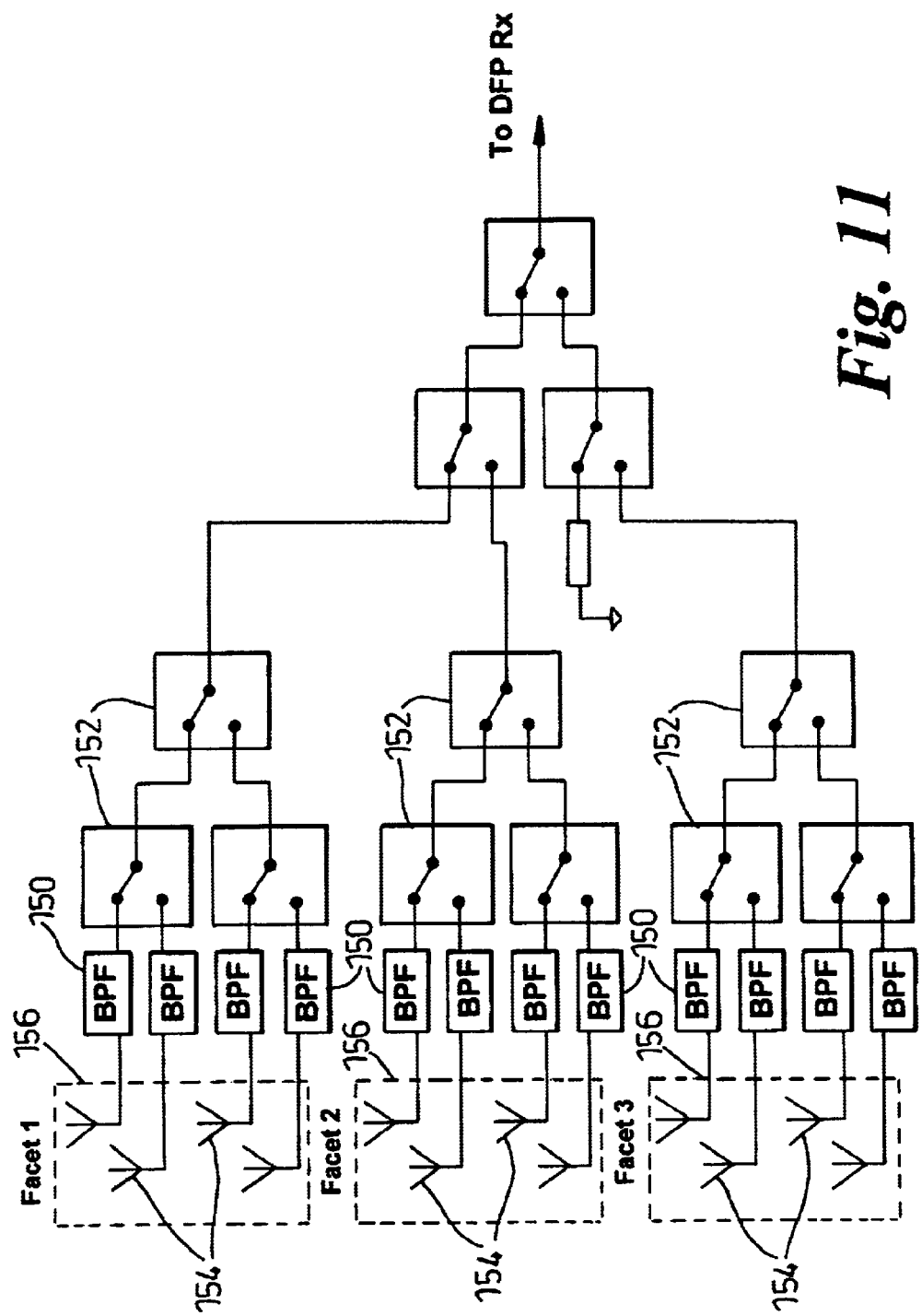
FIG. 11 is a block diagram of a commutating switch arrangement of the embodiment of FIG. 10.

FIG. 11 shows an embodiment of a masthead switching arrangement of filters 150 and switches 152, to be packaged with the antenna elements 154 into compact antenna facets 156. (In practice the switches at the antenna elements would need to be terminating switches, to reduce errors due to mutual coupling. With appropriate switch logic, a terminating switch can be constructed from two 'backward' non-terminating switches in parallel. This will not introduce any additional implementation loss, and so does not alter the link budget or filtering calculations). If using the commutating nature of the DF architecture of many of the embodiments described above, the switches need to have a switching time of the order of ps, and so GaAs FET devices have been selected. These will have an IP3 of the order of +60 dBm, but this will be degraded by a few dB when they are placed in cascade. We can only assume around 30 dB of isolation between the transmit antenna and our DF facet, so if the cellsite is being used to support many transmit carriers at high power, then it is likely that our GaAs switches will generate intermodulation products within the receive band, leading to reduction in DF receiver sensitivity. Worst-case signal-handling cases have been considered for both the 800 MHZ and 1900 MHz bands and it is concluded that receiver desensitisation can be avoided if we have around 20–40 dB of filter rejection (depending on filter slope) within our transmit band. This could be achieved, for example, using a dielectric resonator filter with about 4 sections. Any phase mismatch between different filters can be accounted for by calibration, in order to avoid unacceptable bearing errors.

To summarise, according to embodiments of various aspects of the invention, in a cellular mobile telecommunications system the position of a mobile station can be estimated in terms of its bearing and range from a cell site. A multi-element direction finding antenna at the cell site receives signals from the mobile station and a receiver circuit estimates the bearing using relative phase of signals received at different antenna elements and the range by measuring round trip delay of signals to and from the mobile station. Motion of the mobile station can introduce errors into the bearing estimate due to frequency offset and frequency spread as can carrier frequency offset in mobile station transmissions. Compensation for these errors is introduced by using signal samples successively received at the same antenna element to estimate frequency offset and spread. It is necessary to ensure accurate calibration of the direction finding antenna and the receiver circuit. This can be done by injecting calibration signals into the circuit near the antenna or into the antenna itself from a near field probe. Other aspects of calibration, such as antenna position (pointing direction), can be calibrated using a remote beacon. A beacon emulating a mobile station but at a fixed, known location, or a beacon at an adjacent cell site may be used.

What is claimed is:

1. A method for calibrating a direction-finding antenna and a receiver circuit to which it is coupled in a radio telecommunications system, said receiver circuit including signal-phase-sensitive direction-finding signal-processing equipment, comprising the step of;
   providing a near-field calibration source comprising a radio transmitter within a coverage area of said antenna;
   transmitting a calibration signal from said source for reception by said antenna;
   processing said received calibration sign in said receiver circuit to generate an output; and
   comparing said output with a predetermined reference synchronised with said calibration signal to assess calibration of said antenna and said receiver circuit.

2. A method for calibrating a direction-finding antenna coupled to a receiver circuit situated at a cell site of a cellular radio telecommunications system, a communications transceiver for communicating with mobile stations of said system also being situated at said cell site, comprising the steps of,
   providing a radio transceiver beacon, laving at least partial transmission and reception functionality of one of said mobile stations, at a predetermined, known position at a known bearing and/or distance from said cell site;
   controlling said communications transceiver to set up a call with said beacon during which said beacon transmits signals to said cell site;
   receiving said signals at said direction-finding antenna; and
   processing said received signals in said receiver circuit to estimate a bearing from said cell site to said beacon and/or a distance between said cell site and said beacon and comparing said estimate or estimates with said known bearing and/or distance.

3. A method according to claim 2, in which said step of providing said beacon comprises providing a mobile station compatible with said telecommunications system.

4. A method according to claim 2, in which said beacon is provided at said position such that it can communicate with more than one cell site in order to calibrate direction finding antennas and receiver circuits at each said cell site.

5. A method for calibrating a direction finding antenna situated at a first cell site of a cellular radio telecommunications system, comprising the steps of;
   providing a trasmitter beacon at a second cell site adjacent to said first cell site;
   transmitting a signal from said beacon;
   receiving said signal at said direction-finding antenna; and
   processing said received signal using receiver circuitry coupled to said direction finding antenna to estimate a bearing from said first cell site to said second cell site, comparing said estimate with a known bearing from said first cell site to said second cell site, and calibrating said direction finding antenna and/or said receiver circuitry accordingly.

6. A method according to claim 5, in which said radio telecommunications system is a CDMA (code division multiple access) system and said signal transmitted by said beacon is a narrowband signal within or near the allocated CDMA bandwidth.

7. A method according to claim 5, in which said signal transmitted by said beacon can be used to calibrate direction finding antennas at a plurality of adjacent cell sites.

8. A method for calibrating a direction finding antenna and/or associated receiver circuitry at a cell site of a radio telecommunications system, comprising the step of selecting one or more of the calibration methods of providing a radio transceiver beacon and providing a radio transmitter beacon at an adjacent cell site.

9. An apparatus for calibrating a direction finding antenna and a receiver circuit coupled thereto in a radio telecommunications system, said receiver circuit including phase-sensitive direction-finding signal processing equipment, comprising;
   a support for said antenna;
   a near-field calibration source comprising a radio transmitter mounted on a calibration source support extending from said antenna support;
   a calibration signal generator coupled to said calibration source for transmitting a calibration signal from said calibration source for reception by said antenna and processing by said receiver circuit to generate an output; and
   a comparator or comparing said output with a reference synchronised with said calibration signal to assess calibration of said antenna and said receiver circuit.

10. An apparatus for calibrating a direction finding antenna at a cell site of a cellular radio telecommunications system, a transceiver for communicating with mobile stations also being situated at said cell site, comprising;
    a radio transceiver beacon having at least partial transmission and reception functionality of one of said mobile stations, situated at a predetermined location at a known bearing and/or distance from said cell site;
    a controller at said cell site for controlling said transceiver to set up a call with said beacon during which said beacon transits signals to said cell site;
    a receiver circuit coupled to said direction finding antenna for processing said transmitted signals as received at said direction finding ant and for estimating a bearing from said cell site to said beacon and/or a distance from said cell site to said beacon; and
    a comparator for comparing said estimated bearing and/or distance with said known bearing and/or distance.

11. A beacon for use in an apparatus as defined in claim 10.

12. A beacon according to claim 11, comprising a mobile station compatible with said telecommunications system.

13. An apparatus calibrating a direction finding antenna and/or a receiver circuit coupled thereto situated at a first cell site of a cellular radio telecommunications system, comprising;
    transmitter beacon situated at a second cell site adjacent to said first cell site;

a calibration signal generator coupled to said beacon for causing said beacon to transmit a calibration signal;

said receiver circuit coupled to said direction finding antenna for processing said calibration signal as received by said direction finding antenna to generate an estimated bearing from said first cell site to said second cell site;

a comparator coupled to said receiver circuit for comparing said estimated bearing with a known bearing from said first cell site to said second cell site; and a calibrator for calibrating said direction finding antenna and/or said receiver circuit according to said comparison.

14. An apparatus according to claim 13, in which said radio telecommunications system is a CDMA system and said calibration signal is a narrowband signal within a guardband of the allocated CDMA bandwidth.

15. A calibration beacon as defined in claim 13.

\* \* \* \* \*